United States Patent
Goodsitt et al.

(10) Patent No.: US 11,995,098 B2
(45) Date of Patent: *May 28, 2024

(54) INTERACTIVE SMART COPY METHOD

(71) Applicant: Capital One Services, LLC, McLean, VA (US)

(72) Inventors: Jeremy Goodsitt, Champaign, IL (US); Austin Walters, Savoy, IL (US); Anh Truong, Champaign, IL (US); Vincent Pham, Champaign, IL (US); Galen Rafferty, Mahomet, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,551

(22) Filed: Jan. 17, 2023

(65) Prior Publication Data

US 2023/0153319 A1 May 18, 2023

Related U.S. Application Data

(63) Continuation of application No. 17/506,155, filed on Oct. 20, 2021, now Pat. No. 11,599,553.

(51) Int. Cl.
| | |
|---|---|
| *G06F 16/00* | (2019.01) |
| *G06F 16/22* | (2019.01) |
| *G06F 16/25* | (2019.01) |
| *G06F 40/18* | (2020.01) |

(52) U.S. Cl.
CPC ........ *G06F 16/258* (2019.01); *G06F 16/2282* (2019.01); *G06F 16/252* (2019.01); *G06F 40/18* (2020.01)

(58) Field of Classification Search
CPC ... G06F 16/2282; G06F 16/252; G06F 16/258
See application file for complete search history.

(56) References Cited

U.S. PATENT DOCUMENTS

| | | |
|---|---|---|
| 7,743,317 B2 | 6/2010 | Broman et al. |
| 8,832,543 B2 | 9/2014 | Broman et al. |
| 10,574,707 B1 | 2/2020 | Norquist et al. |
| 11,393,253 B1 | 7/2022 | Maron et al. |
| 2012/0324476 A1 | 12/2012 | Reissman et al. |
| 2013/0055018 A1 | 2/2013 | Joshi et al. |
| 2016/0275066 A1 | 9/2016 | Otero et al. |

(Continued)

OTHER PUBLICATIONS

Koch et al., "Metric-Based Fault Prediction for Spreadsheets, IEEE Transactions on Software Engineering," vol. 47, No. 10, Oct. 2021, pp. 2195-2207. (Year: 2021).*

(Continued)

*Primary Examiner* — Cheryl Lewis
(74) *Attorney, Agent, or Firm* — Banner & Witcoff, Ltd.

(57) ABSTRACT

Systems and methods for automatically profiling data a user selects to transfer to a paste area are described. Data may be automatically profiled the at the user selected target paste area to determine if sets of data are of the same data type. There may be a clarification for a target paste area or for identifying the data type. Additionally, there may be reformatting the selected data set to match the target data's format. Machine learning may trigger formatting or prompting actions according to one or more predetermined thresholds.

20 Claims, 4 Drawing Sheets

(56) References Cited

U.S. PATENT DOCUMENTS

| | | |
|---|---|---|
| 2019/0087397 A1 | 3/2019 | Li et al. |
| 2019/0213249 A1 | 7/2019 | Kistler et al. |
| 2021/0177163 A1 | 6/2021 | Cohn et al. |
| 2021/0382718 A1 | 12/2021 | Agrawal et al. |
| 2021/0382882 A1 | 12/2021 | Mogre et al. |
| 2022/0043935 A1 | 2/2022 | Brannon et al. |

OTHER PUBLICATIONS

Chambers et al., "SheetDiff: A Tool for Identifying Changes in Spreadsheets," 2010 IEEE Symposium on Visual Languages and Human-Centric Computing, pp. 85-92. (Year: 2010).*

* cited by examiner

200

| Name | Eamonn Rich | Judith Bass | Sophie Roberson | Catherine Carpenter | Chris Johnson |
|---|---|---|---|---|---|
| Address | 9231 Cypress St Emmitsburg, MD 21727 | 112 North Pleasant Drive Minnville, TN 37110-6845 | 96 State Drive 202-555-7864 | 7537 James Lane TX | 708 Cleveland St. District Heights, MD 32074 |
| Phone | 202-555-4586 | 423-555-9843 | 202-555-7864 | (816)555-6876 | 667.555.6519 |

— 220
— 225

Would you like to paste in this format and area? — 215

[ Yes ]   [ No ]

— 205
— 210

| | First Name | Last Name | Address 1 | Address 2 | City | State | Zip Code |
|---|---|---|---|---|---|---|---|
| 1 | Paul | Smith | 125 Main | | Annandale | VA | 22003 |
| 2 | Stacie | McCabe | 36 Apple Lane | Apt. 2 | Fairfax | VA | 22030 |
| 3 | Amari | Cano | 3242 Bagwell Ave | | Annapolis | MD | 21411 |
| 4 | Jac | Brown | 4306 Highland View Dr. | | Arlington | VA | 22204 |
| 5 | Piers | Sutherland | 3033 S. 14th St | Apt. 46B | Alexandria | VA | 22304 |
| 6 | Amalie | Barr | 4 Trout Dr. | | Baltimore | MD | 21211 |
| 7 | Eamonn | Rich | 9231 Cypress St | | Emmitsburg | MD | 21727 |
| | | | | Emmitsburg | 21727 | MD | |
| | | | | Minnville | 37110 | TN | |
| | | | | | | TX | |
| 7 | Eamonn | Rich | 9231 Cypress St | | | | |
| 8 | Judith | Bass | 112 N. Pleasant Dr. | | | | |
| 9 | Sophie | Roberson | 96 State Dr. | | | | |
| 10 | Catherine | Carpenter | 7537 James Lane | | | | |

INTERACTIVE SMART COPY METHOD

CROSS-REFERENCE TO RELATED APPLICATIONS

This application claims priority to U.S. Non-Provisional patent application Ser. No. 17/506,155, filed Oct. 20, 2021, the disclosures of which are incorporated by reference herein in their entireties for all purposes and made part hereof.

FIELD OF THE INVENTION

Aspects of the disclosure relate generally to a method of copying and pasting data. More specifically, aspects of the disclosure provide for an automatic comparison check between user selected data and the data located at the user selected paste area, ensuring the selected data will be located in a correct paste area and configured with the correct format.

BACKGROUND OF THE INVENTION

Copying selected data and pasting the selection into a target area is a highly useful feature in today's technological environment. With a few clicks, data may easily be transferred from an originating source, such as a spreadsheet, into a completely different system, such as a web page or word processing document, or even another spreadsheet. Problems arise, however, when the formatting of the data of the originating source may not be the same as that of the new system. Such circumstances lead to a high probability of data errors within the final document. Further, formatting issues are also regularly overlooked, resulting in a product that not only appears clumsy and careless, but is also difficult to read. There is a need for more efficient and error-free systems for data entry.

SUMMARY OF THE INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may address these and other problems, and generally improve the quality, efficiency, and speed of a copy and paste operation by offering an automatic monitoring method to ensure a proper target area and format for relocated data.

Aspects described herein may allow for an automatic monitoring method during a cut and paste operation. This may have the effect of ensuring the proper placement and format of relocated data. According to some aspects, these and other benefits may be achieved by providing a user interactive pop up window to confirm placement of the selected data in the target area when the automated system questions the preferred user target area. In implementation, this may be effected by an automatic data identifier analysis of the user selected data and the data located at the target area, that establishes the type of data within each data set, and then may determine a confidence score above a first threshold that both data sets may be the same data type. When the confidence score is below the first threshold, the system may further generate a user interactive pop up window to confirm placement of the selected data to the target area. This may allow for greater user assurance that the target area is the correct placement for the selected data.

Further aspects described herein may provide for a user interactive pop up window to confirm either data set's data type. When the confidence score is below a second threshold type (e.g., wherein the second threshold is lower than the first threshold), the system may generate a user interactive pop up window to confirm a data set's data type. This may allow the system to better analysis the data and place the user selected data in the correct target area.

Still further aspects described herein may provide for an automatic data format analysis. After determining to place the data in a target area, the system may determine the selected data's format and the target area data's format. After discovering a discrepancy in format, the system may reformat the selected data to match the target area's particular format before adding the selected data to the target area, which may increase efficiency and consistency in the resulting product.

More particularly, some aspects described herein may provide a computer-implemented method for an automated analysis of user selected data and data at a user selected target area during a cut and paste operation. The method may comprise receiving, by a computing device, a request to import a selection of a first data set, the first data set may correspond to a first portion of a first database, to a destination portion of a second database; determining (e.g., by the computing device and may be based on analyzing the selection of a first data set) a first data profile which may correspond to the first data set; determining (e.g., by the computing device and based on the first data profile) a first identifier; determining (e.g., by the computing device) a second data set which may correspond to the destination portion of the second database; determining (e.g., by the computing device and may be based on analyzing the second data set) a second data profile which may correspond to the second data set; determining (e.g., by the computing device and may be based on the second data profile) a second identifier; determining (e.g., by the computing device and may be based on comparing the first data profile with the second data profile, and may be further based on comparing the first identifier with the second identifier) a confidence score; determining (e.g., by the computing device and may be based on determining that the confidence score exceeds a first threshold) that the first data set and the second data set share a same data type; determining, (e.g., by the computing device and may be based on determining the same data type) to add the selection of the first data set to unused data entries of the destination portion of the second database; determining (e.g., by the computing device and may be based on the same data type) a first data entry format for the first data set; determining (e.g., by the computing device and may be based on the same data type) a second data entry format for the second data set; translating (e.g., by the computing device and may be based on determining to add the selection of the first data set to the unused data entries) the selection of the first data set from the first data entry format to the second data entry format; and may add (e.g., by the computing device and may be according to the second data entry format) the translated selection of the first data set to the destination portion of the second database.

Further, the first data set may correspond to a first portion of a first spreadsheet or a columnar first portion of a database. The second data set may correspond to a destination portion of a spreadsheet or a columnar portion of a database. The system may replace the second data set at the destination portion with the first data set. The system may determine unused portions of the second data set as the destination portion for the first data set.

Still further, after determining that the confidence score exceeds the first threshold and after determining to add the selection of the first data set to the unused data entries, the method may send (e.g., by the computing device) a user confirmation request; and the confirmation request may require confirmation of the added selection. The system may translate (e.g., by the computing device and may be based on determining to replace the selection of the first data set to the unused data entries) the selection of the first data set from the first data entry format to the second data entry format.

According to aspects described herein, determining a data profile may comprise analyzing properties of a data set using a data profiling model (e.g., a recurrent neural network model or a convolutional neural network model). Additionally and/or alternatively, determining an identifier may comprise comparing a data profile to an identifier lookup table using at least one of a string or pattern matching, or fuzzy pattern matching. Additionally and/or alternatively, determining the confidence score may comprise a multivariate statistical analysis.

According to aspects described herein, a data type may comprise at least one of a currency, a language, or a coordinate. Additionally and/or alternatively, the data entry formats may comprise at least one of a currency format, a number of characters, or a pattern of characters. Additionally and/or alternatively, the first data set may be a columnar data set, and the destination portion of the second database may be a spreadsheet.

According to aspects described herein, after determining that the confidence score exceeds the first threshold and after determining to add the selection of the first data set to the unused data entries, sending (e.g., by the computing device) a confirmation request for confirmation of the added selection. Additionally and/or alternatively, the system may include determining that the confidence score exceeds a second threshold. The second threshold may be below the first threshold. The confidence score may be lower than the first threshold. The system may send a second confirmation request for confirmation of the same data type (e.g., based on determining that the confidence score exceeds the second threshold). Additionally and/or alternatively, the confirmation request may include an option to cancel the added selection.

Corresponding apparatus, systems, and computer-readable media are also within the scope of the disclosure.

These features, along with many others, are discussed in greater detail below.

As used herein, the term "spreadsheet" means any spreadsheet (e.g.: a Microsoft Excel spreadsheet, a Google Sheet, a Zoho Sheet, or the like), any table, any database (e.g.: an Excel or Zoho database comprising multiple spreadsheets), or the like.

BRIEF DESCRIPTION OF THE DRAWINGS

The present disclosure is illustrated by way of example and not limited in the accompanying figures in which like reference numerals indicate similar elements and in which:

FIG. 2 depicts an example pop up window architecture according to one or more aspects of the disclosure;

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for automatically profiling data a user selects to transfer to a paste area. Further, the method may automatically profile the data located at the user selected target paste area and may determine if both sets of data are of the same data type. If the system determines that the target location may not be the same type of data as the selected transfer data, the system may ask the user for clarification for target paste area or for identifying the data type. Additionally, the system may determine the format of each data set, and may reformat the selected data set to match the target data's format. As discussed further herein, this combination of features may allow for increased efficiency and accuracy during a cut and paste operation.

Before discussing these concepts in greater detail, however, several examples of a computing device that may be used in implementing and/or otherwise providing various aspects of the disclosure will first be discussed with respect to FIG. 1.

Figure 1:
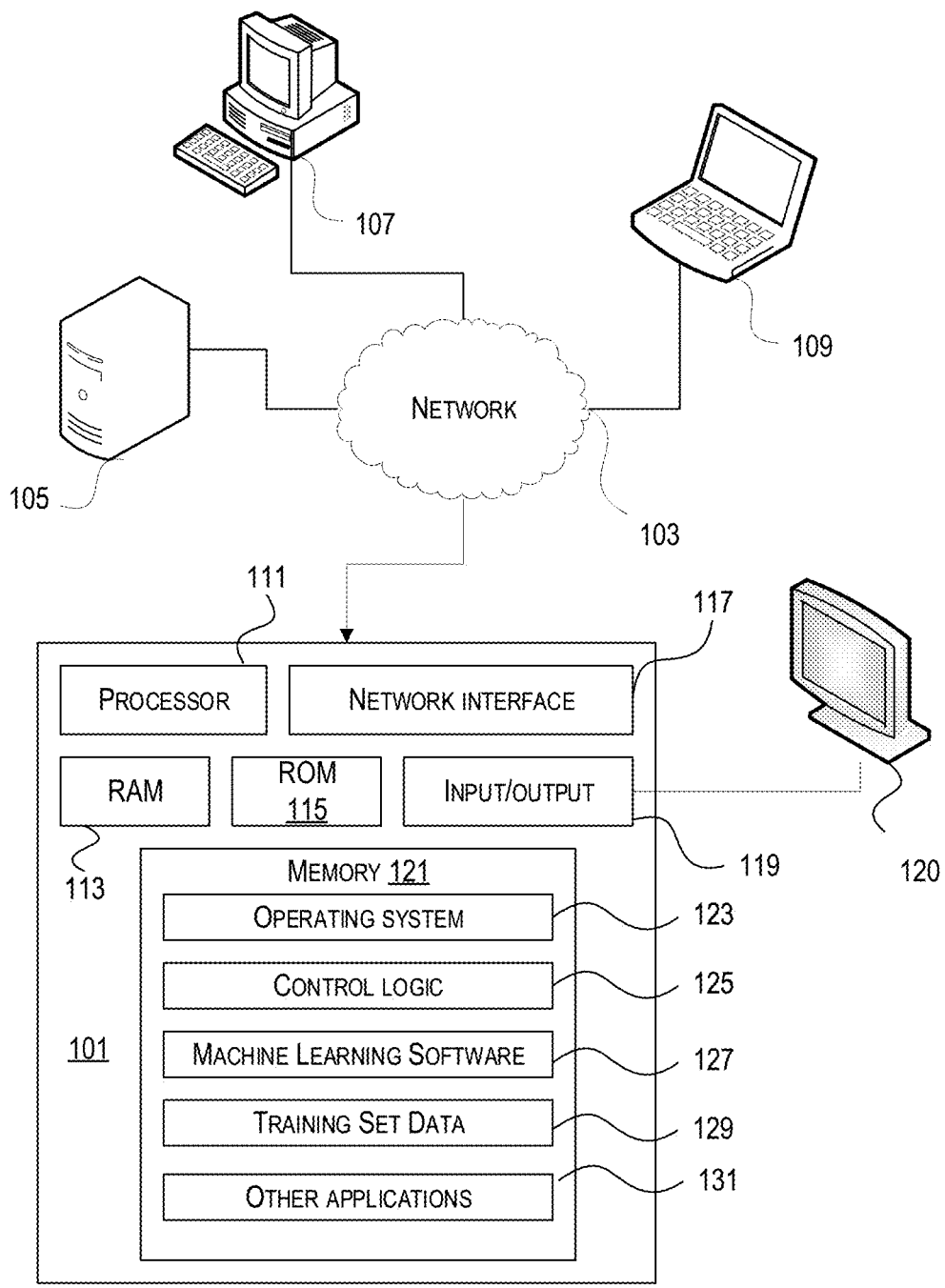
FIG. 1 depicts an example of a computing device that may be used in implementing one or more aspects of the disclosure in accordance with one or more illustrative aspects discussed herein.

FIG. 1 illustrates one example of a computing device 110 that may be used to implement one or more illustrative aspects discussed herein. For example, computing device 110 may, in some embodiments, implement one or more aspects of the disclosure by reading and/or executing instructions and performing one or more actions based on the instructions. In some embodiments, computing device 110 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 110 may, in some embodiments, operate in a standalone environment. In others, computing device 110 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for smart pasting user selected data into a target area.

FIG. 2 illustrates an example interface 200 that may display a popup window 205 on a display device, such as 107, 109, or 120 in FIG. 1, according to a possible embodiment of the invention. A user may select a copy area 225 from an electronic document, such as a spreadsheet 220. The electronic document may be a word processing document, such as Microsoft Word, an email, a webpage, or the like. The user selected area may comprise rows, columns, and/or tables.

User selected copy area 225 may be transferred, or pasted, into user selected target paste area 235. User selected target paste area 235 may be located in the same spreadsheet as user selected copy area 225 or in a second spreadsheet 230. The second spreadsheet 230 may comprise rows, columns, and/or tables. Further, user selected target paste area 235 may be an electronic document, such as a Microsoft Word document, an email, a webpage, or the like. The user selected target paste area 235 may comprise empty spaces or may be data occupied.

The user may select similar or different types of data within the documents. The data may comprise a numeric format. For example, the data may consist of phone numbers, zip codes, price lists, dates, income, or other financially related data. GPS coordinates, FICO scores, and measurements are also examples of data in numeric format that may be used in the present embodiment. The data may take the form of names, either first, middle and/or surnames. Grocery lists, cities, states, companies, months, and other name related data may also be adopted in the present embodiment. The data may be independent and separate from other data in the document, or combined to form a new category of data. For example, personal names, street names, cities, states, and zip codes may be combined to form full mailing addresses.

The present invention may use alphanumeric formats as well as other symbols and punctuation. For example, phone numbers may include the plus sign "+" for indicating the country code and may use parentheses surrounding the zip code. Phone number may optionally use only periods, only dashes, only spaces, or a combination of periods, dashes, and/or spaces between the area code, the three digit office or exchange code, and the four digit subscriber number. For example, a phone number may be in the format "202-555-4586", "423.555.9843", "(816) 555-6876", or "667.555-6519".

Addresses may contain not only alphanumeric formats, combining numbers, letters, and other symbols, but also well known abbreviations. Sendee titles may comprise the full title, such as Mister or Doctor, or an abbreviation (e.g., "Mr." or "Dr."). Street addresses may comprise a house number and a street name. The street name may also be a number. The street name may comprise an abbreviation, such as "St.", "Dr.", "Ten", or may comprise the full names: Street, Drive, Terrace. Addresses may also comprise an apartment, unit, or flat number, which may be abbreviated (e.g., "Apt."), and may comprise one or more numbers, symbols and/or one or more letters (e.g., 12b, 1462, CC, #42). Address abbreviations may be all capitalized, only the first letter capitalized, or all lower case. Abbreviations may comprise a period at the end, such as "St." and "Apt." or the period may be left out.

States within the United States may be abbreviated to the standard two letter abbreviations (e.g., "VA") established by the United States Postal Service (USPS) or the U.S Coast Guard (USCG). States may be set out in a code established by the International Organization for Standardization (ISO) standard, the American National Standards Institutes (ANSI) standard, the Federal Information Processing Standard (FIPS), or a similar standard or authority. For example, FIPS assigns "05" for Arkansas while the USPS uses the code "AR".

Countries may be abbreviated or completely written out. Country abbreviation may take the format from an international or national standard, such as the USPS or ISO. For example, a country may be abbreviated to the 2-letter code, 3-letter code, or the three digit country code established by the ISO. For example, ISO 3166 assigns "BB", "BRB", and "052" for Barbados; "DE", "DEU" and "276" for Germany; "ZA", "ZAF", and "710" for South Africa. Meanwhile, the USPS assigns Barbados the codes "BB" and "058", Germany the codes "DE" and "002", and South Africa the codes "ZA" and "019". However, the USPS requires the full country name in a destination address.

Zip codes may be in the standard 5 digit format or may comprise the "ZIP+4" format preferred by the USPS, which includes a dash. Postcodes for addresses outside the United STATES may contain letters, numbers, and/or symbols according to the particular countries' instructions. For example, Australia assigns a two or three letter abbreviation for each state or territory along with a four digit number (e.g., QLD 4209 and SA 5001).

Global Positioning System (GPS) coordinates may be in various formats, such as degrees, minutes, and second (DMS), degrees and decimal minutes (DMM), and/or decimal degrees (DD) for each longitude and latitude measurement. DMS format comprises numbers as well as the symbols)(°) indicating degrees, (') indicating minutes, (") indicating seconds, and (N), (S), (E), (W) indicating the four cardinal directions (e.g., 41° 24'12.2"N 2° 10'26.5"E). The DMM format comprises numbers, a spacing between the degree and minutes, the symbol (.) indicating decimal minutes, and a comma between the longitude and latitude measurements, and may include the symbol (-) indicating direction (e.g., "41 24.2033, 2 10.4418"). The DD format includes two decimal numbers separated by a comma and may include the symbol (-) indicating direction (e.g., 41.403389, 2.174028).

Financial data may include income, expenses, accounts receivable, costs of goods, inventories, accounts payable, capital, debt, liabilities, assets, property, revenue, and the like. The financial data may be entered into a document in multiple different currencies using different symbols, such as the dollar ("$"), cent ("¢"), euro, ("€"), pound ("£"), yuan ("¥"), and the like. Financial data may also take the format assigned by an international authority, such as the ISO. The ISO 4217 standard gives a three letter code and alternatively a three digit code for both current and historic currencies. For example, the ISO 4217 standard assigns "EUR" and "978" for the Euro, "NZD" and "554" for the New Zealand dollar, "TRY" and "949" for the Turkish lira.

Dates may take many different formats depending on user preference or the standard used in a particular area. Dates may include the day, month, and year. The month may be completely written out (e.g., "March"), abbreviated in a three letter format (e.g., Mar), or abbreviated in a one or two digit number (e.g., "3" or "03"). The month may be all capitalized, first letter capitalized, or with no capitalization. The month abbreviation may also include a period. The day may be in a one or two digit format (e.g., "8" or "08"). The year may be in a two or four digit format (e.g., "20" or "2020"). The date may first recite either the month, day, or year. For example, the date format may be any of the following configurations: MM/DD/YYYY. MM/DD/YY, DD/MM/YY, DD/M M/YYYY, YYY/M M/DD, MM.D-D.YYYY, YYYY.DD.MM, etc. The date may also be completely written out and may include ordinals, abbreviations, and punctuations (e.g., "Mar. 3, 2020", "Mar. 3, 2020").

The system may automatically perform an analysis on the user selected copy area 225 and may also perform an analysis on the user selected target paste area 235, to determine the type of data and format at each area. This analysis may comprise only the specific areas the user selected, or it may include areas of spreadsheet the user did not specifically select, such as surrounding columns and rows of the user selected areas. The analysis may determine the user selected target paste area 235 is the correct placement for the copied data. Further, the analysis may conclude the target area is not the correct placement for user selected copy data from user selected copy area 225 and upon further analysis, the system may determine a proper placement as the system selected target paste area 245 for the user selected data from user selected copy area 225 within the second spreadsheet area 230. Further, the system may determine the format of the user selected data from user selected copy area 225 differs from the data at the second spreadsheet 230.

For example, the system may determine that the data from user selected area 225 includes names and addresses in multiple formats. The system may further analyze the data to determine particular identifying features of the system profile along with the specific data format. For example, the system may analyze that the names include first and last names with no standard format, as some names are in bold and some in italics. Upon further analysis, the system may determine the addresses include house numbers, street names, cities, states, and zip codes with no standard format.

The system may turn to profile user selected target paste area 235. After assessing user selected paste area 235 contains only empty portions of the spreadsheet, the system may analyze the entire second document, spreadsheet 230, or alternatively part of the spreadsheet, to evaluate the type of data, the data format, and how the data is structured within the document. For example, the system may conclude that the first row comprises the name of the columns that identifies the data located in the column: a first name column, a last name column, a first part of a mailing address comprising a house number and street name, a second part of a mailing address comprising an optional address element, a city, a state, and a zip code.

When profiling the sets of user selected copy data and user selected target paste area data, the system may determine that part or all of user selected copy data is written in a different language than user selected target paste data. In this case, the system may translate user selected copy data before or after the step of profiling. For example, the system may determine the user selected copy data is in French while the user selected target paste area is in English. In this case, the system may translate the French user selected copy data before or after profiling to determine an identifier. Further, the system may paste the English translation of the user selected copy data into the user selected target paste area.

The system may determine that the user selected copy data is in a different measurement or currency than the user selected target paste area. In this case, the system may convert the user selected copy data into the measurement or currency standard used at the user selected target paste area. For example, the data at user selected copy area may be in imperial measurements (e.g., feet, inches, pounds, ounces, etc.) or a currency in U.S. dollars ($), while the data at or around user selected target paste area 3 is a measurement in metric units (e.g., meters, grams, etc.) or a currency in British pounds (£). The system may automatically convert user selected copy data into the measurement units or currency used at user selected target paste area before or after profiling to determine an identifier. Further the system may paste the converted measurement or currency into the user selected target paste area.

Further, the system may determine the column or row format structure. For example, the system may ascertain that data in the first name and last name columns are formatted with a capital first letter. The first part of the mailing address comprises numbers then street names, the street names may be in word or number format. The system may further conclude abbreviations in this column contain a period after "Dr", no period after "St" and "Ave", and "Lane" is not abbreviated. The state column is formatted with a two letter abbreviation, capitalized. The zip code is in a five digit format.

After the system determines the data from the user selected copy area and user selected paste area comprise the same identifying features (e.g., first name, last name, street number and name, city, state, zip code), the system may check the accuracy of the user selected target paste area 235 for transferring user selected copy area 225 data. This step may entail determining if part or all of the data is repeated either in the user selected target paste area 235, the surrounding area, or within the spreadsheet 230. If the system determines the step of pasting will duplicate data at the user selected target area, the system may determine not to paste that particular data, paste the repeated data over the original data, or use pop up window 205 to notify the user and request user preference.

When determining user selected target paste area accuracy, the system may determine user selected copy data placement within the user selected target paste area 235. For example, the system may decide the user selected target paste area 235 is either too small or too large for all the data within the user selected copy area 225. Further, the system may determine the placement of user selected target paste area 235 is either correct or needs to be moved to a different portion of second spreadsheet 230.

During this step, the system may determine that the data from user selected copy area 225 requires rearranging in order to properly correspond to the structure at user selected target paste area 235. For example, the system may determine that user selected copy data requires transposing (e.g., cells currently in a row format converted into columns; cells currently in a column format converted into rows) before pasting into user selected target paste area. Further, the system may determine that newly transposed user selected copy data columns and rows require reordering to match the structure at user selected target paste area. The system may determine that the column or rows should be re-arranged into a different order. For example, the selected copy area 225 may have columns in the label order "first name", "last name", and "phone number", whereas the selected target paste area 235 may have columns in the label order "last name", "first name", and "phone number." The system may automatically re-arrange the columns such that the data for "last name" is arranged into the appropriate column in the selected target paste area 235.

Additionally during this step, the system may determine data from the user selected copy area 225 requires additional rows or columns in order to match the spreadsheet, database, or table structure at the user selected target paste area 235. For example, the system may determine that either the rows or columns at the user selected target paste area include a numbered column or row. The system may automatically generate an additional row or column for user selected copy data to add to the numbered column or row at user selected target paste area.

Further, the system may determine that columns or rows from the user selected copy area require separating or combining in order to match the spreadsheet, database, or table structure at the user selected target paste area. For example, a column at user selected copy area may contain both first and last names, while the same data at the user selected target paste area is structured in two columns, one for first names and one for last names. The system may then structure the data from the user selected copy area to match the structure at the user selected target past area by separating the first and last name data from the user selected copy data and positioning the data in two separate columns.

The system may continue to analyze the user selected copy data and user selected target paste area data for format conformity. For example, the system may determine the font, size, and/or typographical emphasis (e.g., bold, italic, underline, etc.) are not the same format at user selected target paste area. For example, the system may determine that the font used at user selected target paste area is Times New Roman, while the font used at user selected copy area is Arial. In this case, the system may change the font of the user selected copy area data into Times New Roman before pasting the data into the user selected target area. Alternatively, the system may only analyze the format at user selected target paste area and automatically modify all the user selected copy data into the target area format before pasting.

The system may determine that using user selected target paste area would position the user selected copy data incorrectly within spreadsheet. In this case, the system may then analyze the user selected target paste area and surrounding areas for transferring the user selected copy data so that after pasting, the copied data is pasted correctly within the target area. For example, the system may determine that the user selected target paste area 235 would not correctly align user selected copy area 225 data with the data already located within second spreadsheet 230. In this case, after correctly formatting both the data and the structure of the columns, rows, and/or tables of the user selected copy area 225, the system may analyze second spreadsheet 230 to determine a correct placement 245 of the user selected copy area 225. After determining the system selected target paste area 245 different than the user selected target paste area 235, the system may generate a popup window 205 to confirm the new system selected target paste are 245. The popup window may allow for user confirmation of the paste (e.g., by selection of 210), and may allow for an opportunity for the user to cancel the paste (e.g., by selection of 215). The popup window 205 may allow for confirmation of the user selected copy data 225 format transformation to the target area data format 240.

Figure 3:
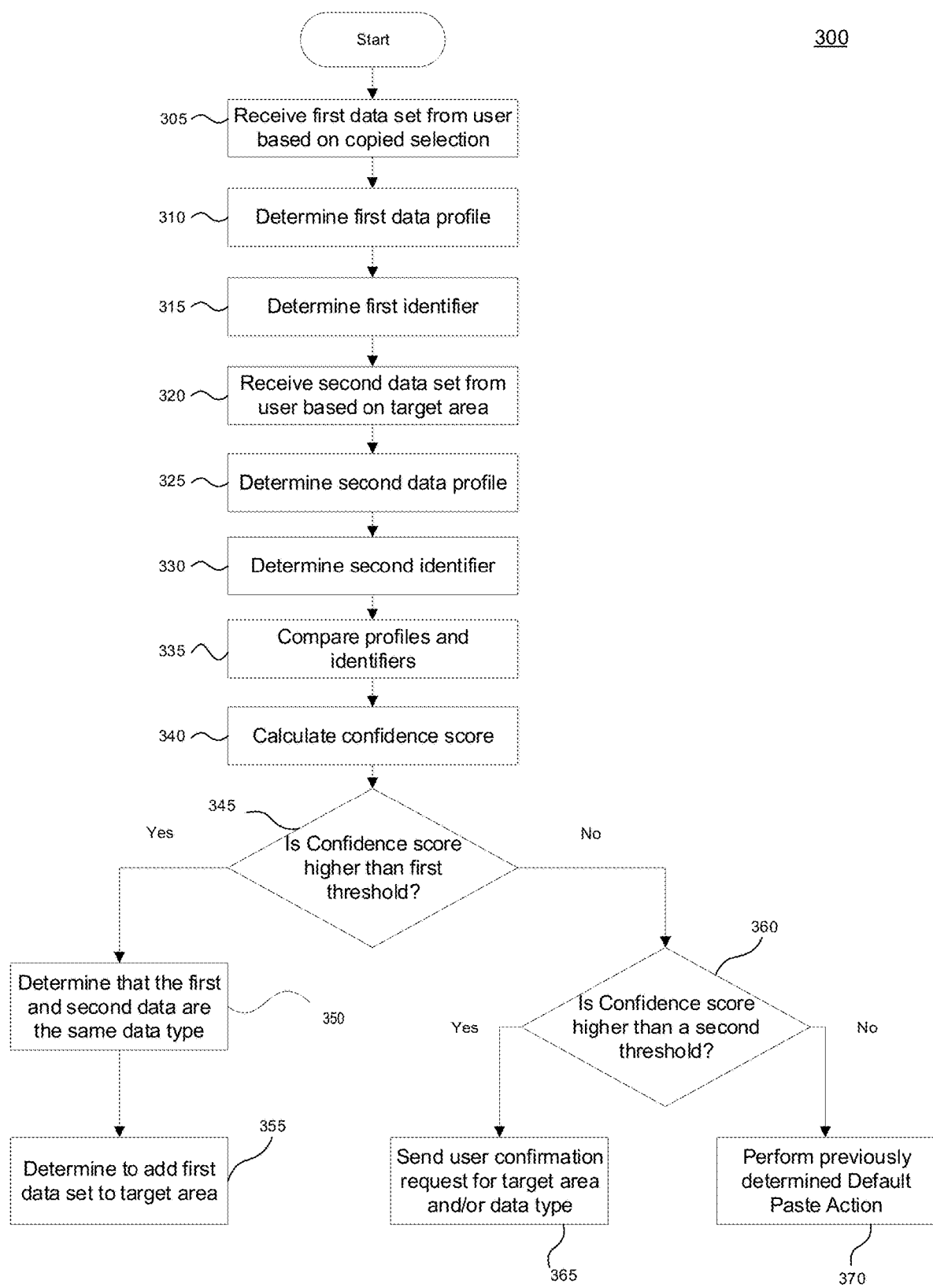
FIG. 3 depicts an example flow chart for a method of comparing data profiles and identifiers to determine a confidence score.

FIG. 3 illustrates an example method 300 for analyzing user selected data and data in a target area in accordance with one or more aspects described herein. Method 300 may be implemented by a suitable computing system, as described further herein. For example, method 300 may be implemented by any suitable computing environment by a computing device and/or combination of computing devices, such as computing devices 101, 105, 107, and 109 of FIG. 1. Method 300 may be implemented in suitable program instructions, such as in machine learning software 127, and may operate on a suitable training set, such as training set data 129.

At step 305, the system may receive the user selected copy area 225 data as a first data set. The user may select the first data set with the intention of pasting the data from the user selected copy area 225 into a user selected target paste area 235 of spreadsheet 230. The first data set may be a type of number, such as a FICO score, a phone number, a house number, a date, a zip code, an amount, or the like as described above. The first data set may also be entered in alphabetical characters, such as a name, street address, groceries, and the like. The data may also be any combination of alphanumeric characters such as a complete address, different phone number formats, a GPS coordinate with decimals, degrees, minutes and/or seconds, or similar items. Further, the data may be in a particular language or currency, as described above. For example, the first data set may include a spreadsheet row, each cell including a first and last name.

The first data set may be constructed in different data formats, such as different fonts and sizes. The data may comprise different typographical emphasis (such as bold, italics, strike through, etc.). Alternatively, the data may be structured in different file types, such as textual data (such as HyperText Markup Language (HTML), extensible Markup Language (XML), plain text, or the like); image data (such as JPEG, TIFF, PDF, or the like); tabular data (such as comma-separated values (CSV), tab-delimited file (TAB), or the like); or other field type.

At step 310, the system may automatically determine a first data profile of the first data set of user selected copy area 225. The data profiling method may incorporate procedures and mechanisms to store, retrieve, analyze, and process data information. These procedures may include the use of data profiling machine learning models, such as recurrent neural network models (RNN), or a convolutional neural network models (CNN). Consistent with the present disclosures, other data profiling models and algorithms may also be employed, such as support-vector networks, induction of decision trees, random forests, bootstrap aggregating, k-means clustering, k-nearest neighbors (k-NN), k-medoids clustering, regression, Bayesian networks, relevance vector machine (RVM), support vector machines (SVM), generative adversarial networks (GAN), and the like. The present discloser may utilize other statistical analysis methods, such as multivariate or univariate statistical analysis.

Selected data may be transferred into a memory device within a processor or computing device. Machine learning software located within the processor or computing device may be configured to receive the selected data. Machine learning software may be previously trained, run a training program immediately subsequent data profiling, or designed for active learning along side the data profiling step. Training may entail one or more training dataset batches, one or more epochs, hyperparameter tuning, optimization models, and the like.

The processor or computing device may be configured to automatically read the first data set, determine a characterization profile of the selected data set using the above described models, algorithms, or methods. The first data profile may reflect one or more of a number, a name, an amount, a currency, or other description. For example, the profile may return "Smith" as a name, "202-555-4586" as a number, or "Fairfax" as a place.

At step 315, the system may automatically determine a first identifier from the first data profile of the data located in user selected copy area 225. Here, the system may use any of the above described models, algorithms, or methods to determine a first identifier from the first data profile. Further, the system may use any look up tables, such as SQL tables, or algorithms, such as string searching algorithms, with or without fuzzy searching.

. The first identifier may be a column or row title, a name, an address, an amount, a specific number, or the like. For example, the profile "Smith" may be identified as "Last Name" by a well-known last name table. Further, the system may determine "Fairfax" as a city, since "Fairfax" is in the same column as "Annandale" and "Annapolis" and all three are within an exemplary well-known city table.

The system may analyze alphanumeric and symbol patterns to determine a first identifier. For example, phone numbers may be categorized with various formats, as described above. The entries "202-555-4586" and "(816) 555-6876" may be profiled by the system as "number" then identified as a phone number by the associated digit, dash, parentheses patterns. Further, a GPS coordinate "41 24.2033, 2 10.4418" may also be profiled as "number" by the system at step 310. At step 315, the system may identify entry "41 24.2033, 2 10.4418" as a GPS coordinate given the degrees and decimal minutes (DMM) format of numbers, spaces, periods, and commas. FICO scores may also be profiled by the system as "number" but identified as a FICO score due to the standard three digit number format.

At step 320, the system may automatically receive a second data set from the user. This second data set may correspond to data at user selected target paste area 235. The user selected target paste area 235 may be a spreadsheet column, a spreadsheet row, a combination of spreadsheet columns and rows, a table column, a table row, a combination of table columns and rows, and/or a database selection. Further, the target area may be a document (like Microsoft Word or OneNote, Google Docs, Zoho Docs, Evernote, or the like), a slide (like Microsoft PowerPoint, Google Slides, or the like), a webpage, an email, or the like.

At step 325, the system may automatically determine a second data profile based on the second data set from the user. The second data profile calculation may utilize only the user selected data or may consider the area surrounding the user selected target paste area 235, such as the entire row, column, or spreadsheet. At this point, the system may use any of the above described models, algorithms, or methods to determine the second data profile. Further the system may use the same or different model, algorithm, or method as the first data profile determination. For example, the system may use a machine learning method, such as a recurrent neural network model (RNN), to determine a second data profile from the second data set.

At step 330, the system may automatically determine a second identifier based at least partially on the second data profile. At this point, the system may use any of the above described models, algorithms, or methods to determine the second identifier. Further the system may use the same or different model, algorithm, or method as the second identifier determination. For example, after determining the second profile using an RNN, the system may use a look up table with fuzzy pattern matching to ascertain the second identifier. In this case, the system may access a table of well known last names and use a pattern recognition application which allows for more than the exact query to be found. For example, the system may return an 80% probability that "Smyth" is a well known last name, even though the look up table has an entry for "Smith".

At step 335, the system may automatically compare the first and second profiles and the first and second identifiers. The comparison may use any of the above described models, algorithms, or methods to compare the first profile to the second profile as well as the first identifier to the second identifier. The comparison may indicate how closely the first profile or identifier matches the second profile or identifier. For example, the resulting comparison may produce a probability, either as a number or percentage, that the first profile matches the second profile. Further, the comparison may produce a second probability, either as a number or percentage, that the second identifier matches the first identifier.

For example, the system may next determine the probability of each entry in the set, then combine and compare the entry probabilities to determine matching identifiers. The first set of "Smyth", "Rich", and "Carpenter" have an 80%, 65%, and 75% chance of being a last name, respectively. The system may determine the second data set including "Wilson", "Lopez", and "Wang" has a combined 70% probability of being a last name. When comparing the probabilities of both sets, the system may determine both sets of profiles "name" and identifiers, "last name", are close enough to match. Consequently, pasting the first set to the second set is correct.

At step 340, the system may automatically use the profile comparison and identifier comparison results to calculate a confidence score. The system may use any of the above described models, algorithms, methods, or the like to calculate a confidence score from the comparison results. For example, the system may average the probability that the first profile matches the second profile with the probability that the second identifier matches the first identifier.

At step 345, the system may automatically determine if the confidence score is higher than a first threshold. The first threshold may be previously calculated and programmed into the system. The determination may use any of the above described models, algorithms, methods or the like to determine if the confidence score is higher than a first threshold. For example, the system may use a comparison function to compare the confidence score to a threshold and output the result to the system.

At step 350 (e.g., after determining the confidence score higher than the first threshold), the system may automatically determine a first data type from the first data set, a second data type from the second data set, and compare the resulting first data type to the second data type. The system may use any of the above described models, algorithms, methods, or the like to determine the first and second data type from the first and second data set, respectively, as disclosed further in FIG. 4 below.

At step 355, the system may automatically determine to add the first data set to the user selected target area, based at least in part on the confidence score and matching data type between the first and second data sets. The system may use any of the above described models, algorithms, methods, or the like to determine to add the first data set to the user selected target area. The system may automatically determine the user selected target area comprises a currently unused or used areas of the spreadsheet. For example, if the system determines the user selected target area comprises used portions, the system may configure a pop up window for user confirmation of the paste.

Further, the system may determine the user is importing data already located at the user selected target area. For example, the system may discover that "Eamonn Rich" in the first data set is already located within or near to the user selected target area. The system may configure a pop up window alerting the user to the repetitive data. Additionally and/or alternatively, the system may automatically configure repetitive data from the first data set to copy over identical data at or near the user selected paste area.

At step 360, (e.g., after determining the confidence score is not higher than the first threshold) the system may automatically determine if the confidence score is higher than a second threshold, the second threshold lower than the first threshold. The system may use any of the above described models, algorithms, methods, or the like to determine if the confidence score is higher than a second threshold. Further, the system may use the same or a different model, algorithm, method, or the like as used above in step 345 to determine if the confidence score was higher than the first threshold.

At step 365, (e.g., after determining the confidence score is higher than a second threshold) the second threshold lower than the first threshold, the system may automatically configure a popup window for user confirmation of the target paste area and/or data type. For example, the system, using any of the above described models, algorithms, methods, or the like, may determine a section near the user selected paste area or within the user selected past area that better matches the first data set. Additionally or alternatively, the popup window 205 may confirm the data type located at the user selected target paste area 235 or system selected target paste area 245.

The popup window 205 may provide a graphical user interface (GUI) for user input. The user may user the popup window to suggest a different target paste area, confirm the current paste area, or cancel the paste action. The GUI may allow the user to change the format of either the data set from the user selected copy area 225 or the data set from the user selected target paste area 253.

At step 370, (e.g., after determining the confidence score is lower than a second threshold, the second threshold lower than the first threshold) the system may automatically perform a previously determined paste action. The previously determined paste action may be, for example, blind pasting, canceling the paste request, and/or generating a user warning pop up window.

Figure 4:
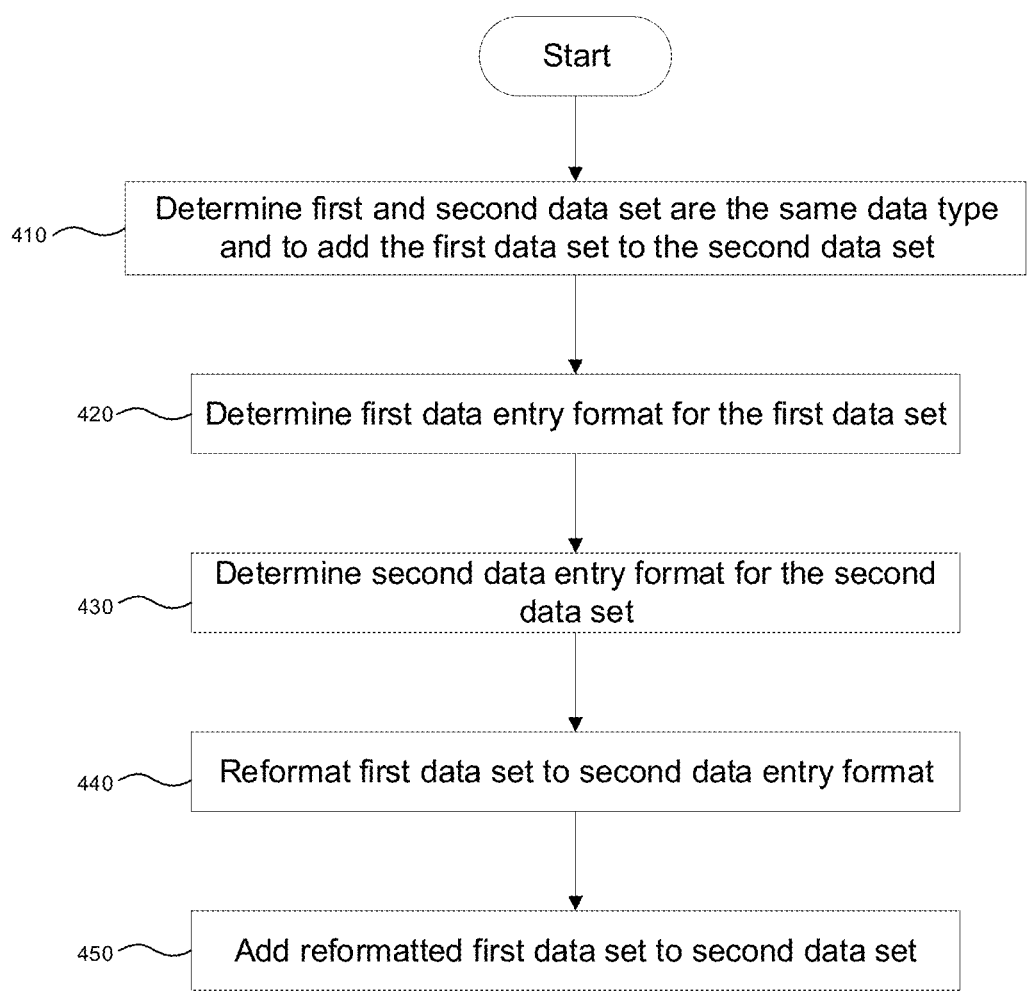
FIG. 4 depicts an example flow chart for a method of reformatting a first data set to match the format of a second data set.

FIG. 4 illustrates an example flow chart for a method of reformatting a first data set to match the format of a second data set according to an embodiment of the invention. The system may reformat the first data set from user selected copy area 225 to match the format of the second data set from user selected target paste area 235, or alternatively the surrounding area on second spreadsheet 230, after determining to add the first data set to the second data set at step 355 in FIG. 3. The method may be implemented with processor 111 and may additionally use machine learning software 127 in FIG. 1. The product may be displayed on devices 107, 109, and/or 120.

At step 410, the system may determine that the first data set from user selected copy area 225 is the same data type as the second data set from user selected target paste area 235 or the surrounding area in the second spreadsheet 230, at step 350 in FIG. 3. The system may use the profile comparison or the identifier comparison at step 335 in FIG. 3 to determine matching data type. For example, the system may conclude that the profile "Number" or identifier "FICO score" is a data type, and that both data sets comprise the same data type. Alternatively, the system may use a machine learning model, such as RNN, to determine if the both data sets correspond to a similar data type. Data types may include dates, addresses, parts of addresses, currencies, measurements, GPS coordinates, FICO scores, grades, time, or the like.

At step 420, the system may determine the first data entry format for the first data set from the user selected copy area 225. For example, the system may determine the first data type is a date. The system may then determine the date format. The format may contain a specific number of characters, symbols, or punctuation. Further, the format may specific a specific character pattern. For example, the system may determine that the date is in the format MM-DD-YYYY.

At step 430, the system may determine the second data entry format for the second data set from user selected target paste area 235 and/or the surrounding second spreadsheet 230. For example, the system may determine that the dates from a nearby column of spreadsheet 230 is in the format of DD-MM-YYYY.

At step 440, the system may change the format of the first data set, from the user selected copy area 225, to the second data entry format detected and identified in step 430. For example, the system may change the data format of the first data set from MM-DD-YYYY to DD-MM-YYYY.

At step 450, the system may add the reformatted first data set to either user selected target paste area 235 or the system selected target paste area 245. The reformatted first data set may copy over data already at user selected target paste area 235 or system selected target paste area 245. Alternatively, the system may place the reformatted first data set into an unused portion of the selected target paste area 235 or the system selected target paste area 245.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, by a computing device, a request to import a selection of a first data set, the first data set corresponding to a first portion of a first spreadsheet, to a destination portion of a second spreadsheet;
determining, by the computing device and based on analyzing the selection of the first data set, a first data profile corresponding to the first data set;
determining, by the computing device, a second data set corresponding to the destination portion of the second spreadsheet;
determining, by the computing device and based on analyzing the second data set, a second data profile corresponding to the second data set;
determining, by the computing device and based on comparing the first data profile with the second data profile, a confidence score;
determining, by the computing device and based on determining that the confidence score exceeds a first threshold, that the first data set and the second data set share a same data type;
determining, by the computing device and based on determining the same data type, to add the selection of the first data set to data entries of the destination portion of the second spreadsheet;
determining, by the computing device and based on determining the same data type, a first data entry format for the first data set;
determining, by the computing device and based on determining the same data type, a second data entry format for the second data set;
determining, by the computing device, a format discrepancy between the first data set and the second data set;
translating, by the computing device and based on determining the format discrepancy, the selection of the first data set to the second data entry format; and
adding, by the computing device and according to the second data entry format, the translated selection of the first data set to the destination portion of the second spreadsheet.

2. The method of claim 1, wherein determining a data profile comprises:
analyzing properties of a data set using a data profiling model using at least one of a recurrent neural network model or a convolutional neural network model.

3. The method of claim 1, further comprising:
determining, by the computing device and based on the first data profile, a first identifier;
determining, by the computing device and based on the second data profile, a second identifier, wherein determining an identifier comprises comparing a data profile to an identifier lookup table using at least one of a string or pattern matching or fuzzy pattern matching; and
further determining, based on based on comparing the first identifier with the second identifier, the confidence score.

4. The method of claim 3, wherein further determining the confidence score further comprises:
determining that the confidence score fails to satisfy the first threshold and the confidence score exceeds a second threshold, wherein the second threshold is lower than the first threshold; and
sending a confirmation request for confirmation of the same data type.

5. The method of claim 1, wherein the determining the confidence score comprises a multivariate statistical analysis.

6. The method of claim 1, wherein the same data type comprises at least one of a currency, a language, or a coordinate.

7. The method of claim 1, wherein the first data entry format comprises at least one of a currency format, a number of characters, or a pattern of characters.

8. The method of claim 1, wherein the first spreadsheet and the second spreadsheet are a same spreadsheet.

9. The method of claim 1, wherein after determining that the confidence score exceeds the first threshold, sending, by the computing device, a confirmation request to confirm adding the first data set to the destination portion of the second spreadsheet.

10. The method of claim 9, wherein the confirmation request allows for an option to cancel the added selection.

11. An apparatus comprising:
one or more processors; and
memory storing instructions that, when executed by the one or more processors, cause the apparatus to:
receive a request to import a selection of a first data set, the first data set corresponding to a first portion of a first spreadsheet, to a destination portion of a second spreadsheet;

determine, based on analyzing the selection of the first data set, a first data profile corresponding to the first data set;

determine a second data set corresponding to the destination portion of the second spreadsheet;

determine, based on analyzing the second data set, a second data profile corresponding to the second data set;

determine, based on comparing the first data profile with the second data profile, a confidence score;

determine, based on determining that the confidence score exceeds a first threshold, that the first data set and the second data set share a same data type;

determine, based on determining the same data type, to add the selection of the first data set to data entries of the destination portion of the second spreadsheet;

determine, based on determining the same data type, a first data entry format for the first data set;

determine, based on determining the same data type, a second data entry format for the second data set; and add, according to the second data entry format, the first data set to the destination portion of the second spreadsheet.

12. The apparatus of claim 11, wherein the instructions, when executed, cause the apparatus to determine the data profile by analyzing properties of a data set using a data profiling model using at least one of a recurrent neural network model or a convolutional neural network model.

13. The apparatus of claim 11, wherein the instructions, when executed, cause the apparatus to:
 determine, based on the first data profile, a first identifier;
 determine, based on the second data profile, a second identifier, wherein determining an identifier comprises comparing a data profile to an identifier lookup table using at least one of a string or pattern matching or fuzzy pattern matching; and
 further determine, based on based on comparing the first identifier with the second identifier, the confidence score.

14. The apparatus of claim 13, wherein after further determining the confidence score, the instructions, when executed, cause the apparatus to:
 determine that the confidence score fails to satisfy the first threshold and the confidence score exceeds a second threshold, wherein the second threshold is lower than the first threshold; and
 send a confirmation request for confirmation of the same data type.

15. The apparatus of claim 11, wherein the instructions, when executed, cause the apparatus to:
 determine a format discrepancy between the first data set and the second data set; and
 translate, based on determining the format discrepancy, the selection of the first data set to the data entry format for the second data set.

16. The apparatus of claim 11, wherein the same data type comprises at least one of a currency, a language, or a coordinate.

17. The apparatus of claim 11, wherein the first data entry format comprises at least one of a currency format, a number of characters, or a pattern of characters.

18. The apparatus of claim 11, wherein the first spreadsheet and the second spreadsheet are the same spreadsheet.

19. The apparatus of claim 11, wherein after determining that the confidence score exceeds the first threshold, the instructions, when executed, cause the apparatus to:
 send a confirmation request to confirm adding the first data set to the destination portion of the second spreadsheet.

20. A system comprising:
 a first computing device comprising:
 one or more first processors; and
 first memory storing first instructions that, when executed by the one or more first processors, cause the first computing device to:
  receive a request to import a selection of a first data set, the first data set corresponding to a first portion of a spreadsheet, to a destination portion of the spreadsheet;
  determine, based on analyzing the selection of a first data set, a first data profile corresponding to the first data set;
  determine a second data set corresponding to the destination portion of the spreadsheet;
  determine, based on analyzing the second data set, a second data profile corresponding to the second data set;
  determine, based on comparing the first data profile with the second data profile, a confidence score;
  send, based on determining that the confidence score exceeds a threshold, a confirmation request to confirm adding the first data set to the destination portion of the spreadsheet;
  determine, based on determining that the confidence score exceeds a first threshold, that the first data set and the second data set share a same data type;
  determine, based on determining the same data type, to add the selection of the first data set to data entries of the destination portion of the spreadsheet;
  determine, based on determining the same data type, a first data entry format for the first data set;
  determine, based on determining the same data type, a second data entry format for the second data set;
  determine a format discrepancy;
  translate, based on determining the format discrepancy, the selection of the first data set to the second data entry format; and
  add, based on a received confirmation request and according to the second data entry format, the translated selection of the first data set to the destination portion of the spreadsheet.

* * * * *